(12) United States Patent
Kwon

(10) Patent No.: US 10,599,904 B2
(45) Date of Patent: Mar. 24, 2020

(54) ELECTRONIC DEVICE FOR MEASURING BIOMETRIC INFORMATION AND METHOD OF OPERATING SAME

(71) Applicant: Samsung Electronics Co., Ltd., Suwon-si, Gyeonggi-do (KR)

(72) Inventor: Soon-Hwan Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/449,141

(22) Filed: Mar. 3, 2017

(65) Prior Publication Data

US 2017/0255812 A1  Sep. 7, 2017

(30) Foreign Application Priority Data

Mar. 4, 2016 (KR) .................. 10-2016-0026626

(51) Int. Cl.
*G06K 9/00* (2006.01)
*G06F 3/041* (2006.01)
*G06F 3/0488* (2013.01)

(52) U.S. Cl.
CPC .......... *G06K 9/00013* (2013.01); *G06F 3/041* (2013.01); *G06F 3/04883* (2013.01); *G06F 2203/04105* (2013.01); *G06F 2203/04108* (2013.01)

(58) Field of Classification Search
USPC ........................................ 382/124
See application file for complete search history.

(56) References Cited

U.S. PATENT DOCUMENTS

| | | | |
|---|---|---|---|
| 9,044,150 B2 | 6/2015 | Brumback et al. | |
| 2003/0138763 A1* | 7/2003 | Roncalez | A63B 24/0003 434/254 |
| 2007/0282182 A1* | 12/2007 | Messerges | A61B 5/0059 600/324 |
| 2008/0097228 A1* | 4/2008 | Aihara | A61B 5/02116 600/490 |
| 2008/0221414 A1* | 9/2008 | Baker | A61B 5/14551 600/310 |
| 2008/0287770 A1* | 11/2008 | Kurzweil | A61B 5/0408 600/388 |
| 2010/0163023 A1* | 7/2010 | Singh | A61M 16/04 128/200.26 |
| 2012/0214144 A1* | 8/2012 | Trotta | G09B 23/281 434/267 |
| 2014/0036091 A1* | 2/2014 | Zalev | A61B 8/52 348/163 |

(Continued)

FOREIGN PATENT DOCUMENTS

| | | |
|---|---|---|
| KR | 10-0880392 B1 | 1/2009 |
| KR | 10-2015-0082045 A | 7/2015 |
| KR | 10-2015-0145550 A | 12/2015 |

*Primary Examiner* — Jerome Grant, II
(74) *Attorney, Agent, or Firm* — Jefferson IP Law, LLP

(57) ABSTRACT

A method of operating an electronic device is provided. The method includes detecting a gesture through a first sensor module, acquiring first biometric information through a second sensor module in response to the gesture, determining whether a user's skin contacts the second sensor module based on the first biometric information, and acquiring second biometric information from the user's skin through the second sensor module according to a result of the determination.

18 Claims, 13 Drawing Sheets

(56) References Cited

U.S. PATENT DOCUMENTS

| | | | |
|---|---|---|---|
| 2014/0275852 A1* | 9/2014 | Hong | A61B 5/02427 600/301 |
| 2014/0350706 A1* | 11/2014 | Morishima | G10K 15/04 700/94 |
| 2015/0161459 A1* | 6/2015 | Boczek | G06K 9/00885 382/115 |
| 2016/0354032 A1* | 12/2016 | Wariar | A61M 5/1723 |
| 2017/0172510 A1* | 6/2017 | Homyk | A61B 5/721 |
| 2017/0188844 A1* | 7/2017 | Banet | A61B 5/0205 |
| 2017/0188918 A1* | 7/2017 | Banet | A61B 5/14551 |
| 2017/0309162 A1* | 10/2017 | Oberholzer | G06F 21/32 |
| 2017/0319817 A1* | 11/2017 | Morishima | A61M 21/02 |
| 2018/0014763 A1* | 1/2018 | Newberry | A61B 5/14546 |
| 2018/0060757 A1* | 3/2018 | Li | G06N 99/005 |
| 2018/0065022 A1* | 3/2018 | Ding | A63B 71/06 |
| 2018/0074646 A1* | 3/2018 | Dow | G06F 3/0416 |
| 2018/0341389 A1* | 11/2018 | Kim | G06F 3/04842 |
| 2019/0057660 A1* | 2/2019 | Lee | G06F 21/32 |
| 2019/0216376 A1* | 7/2019 | Esenaliev | A61B 5/0095 |
| 2019/0290173 A1* | 9/2019 | Newberry | G16H 40/67 |

* cited by examiner

ELECTRONIC DEVICE FOR MEASURING BIOMETRIC INFORMATION AND METHOD OF OPERATING SAME

CROSS-REFERENCE TO RELATED APPLICATION(S)

This application claims the benefit under 35 U.S.C. § 119(a) of a Korean patent application filed on Mar. 4, 2016 in the Korean Intellectual Property Office and assigned Serial number 10-2016-0026626, the entire disclosure of which is hereby incorporated by reference.

TECHNICAL FIELD

The present disclosure relates to an electronic device for measuring biometric information and a method of operating the same.

BACKGROUND

Recently, the development of portable electronic devices has rapidly progressed. The portable electronic device may include a sensor that may measure a biometric signal from a body. The sensor may measure a biometric signal such as a heart rate or blood oxygen saturation. The portable electronic device may output information related to the user's body by processing and analyzing the measured biometric signal. The user may figure out his/her own body state by identifying the information related to the body from the portable electronic device.

In connection with the figuring out of the user's body state, a state in which user's biometric information can be accurately measured through the sensor should be maintained to measure accurate user's biometric information. At this time, a particular application should be executed to measure the user's biometric information, so that it is difficult to measure the biometric information at the moment the user desires without delay. Further, even though the biometric information is measured without delay, it is difficult to determine whether the current state corresponds to a state in which the user's biometric information can be accurately measured through the sensor.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for determining whether a current state is a state in which biometric information can be measured through a sensor, and a method of controlling the same.

In accordance with an aspect of the present disclosure, a method of operating an electronic device is provided. The method includes detecting a gesture through a first sensor module, acquiring first biometric information through a second sensor module in response to the gesture, determining whether a user's skin contacts the second sensor module based on the first biometric information, and acquiring second biometric information from the user's skin through the second sensor module according to a result of the determination.

In accordance with another aspect of the present disclosure, an electronic device is provided. The electronic device includes a memory, a first sensor module configured to detect a gesture, a second sensor module configured to measure biometric information, and at least one processor configured to acquire first biometric information through the second sensor module in response to the gesture, determine whether a user's skin contacts the second sensor module based on the first biometric information, and acquire second biometric information from the user's skin according to a result of the determination.

In measuring biometric information related to the user's skin, an electronic device according to an embodiment of the present disclosure can efficiently determine a state in which the biometric information can be measured and more accurately and conveniently perform the measurement of the biometric information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
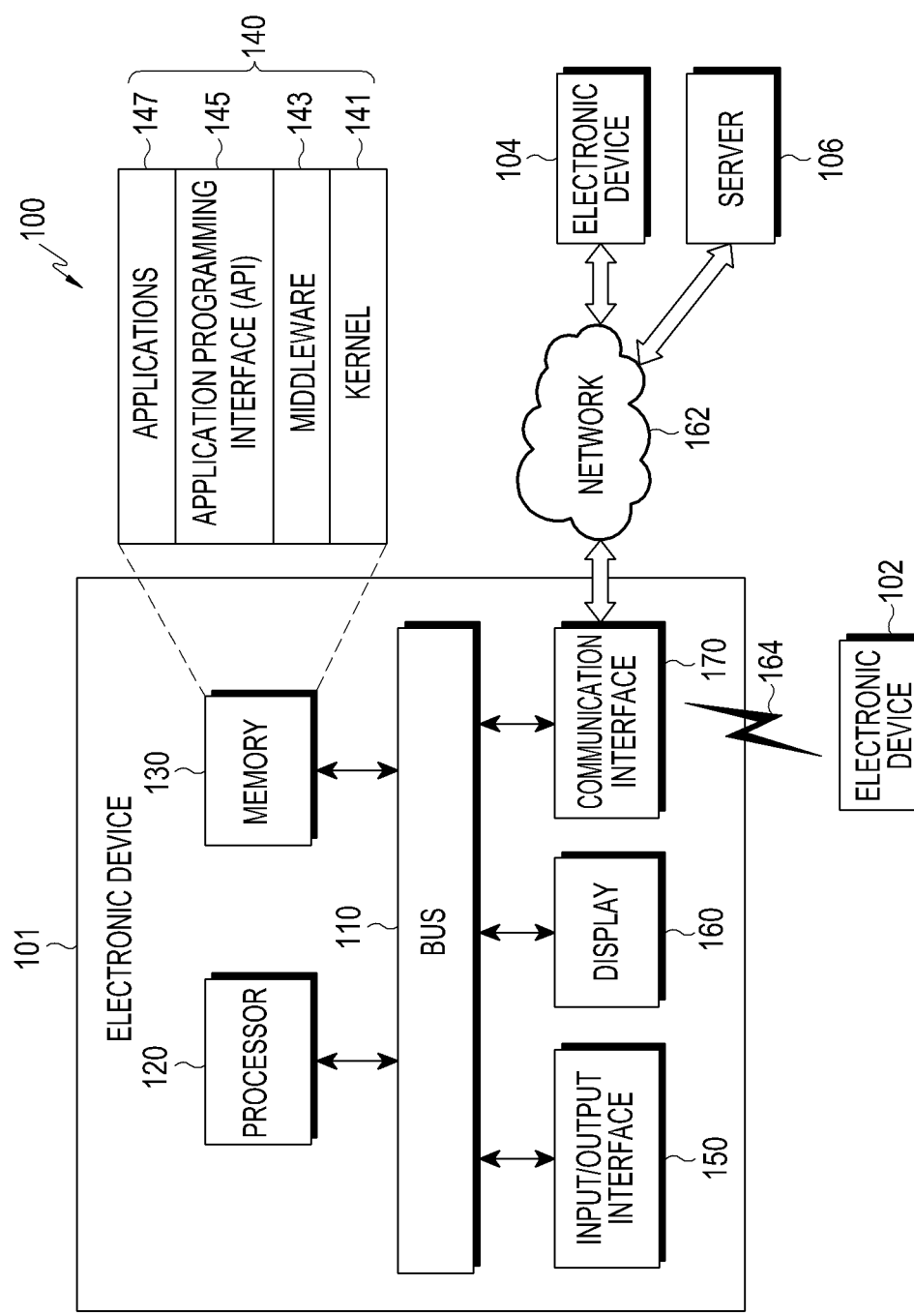
FIG. 1 is a block diagram illustrating an electronic device and a network according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.) According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter) In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1.

FIG. 1 is a block diagram illustrating an electronic device and a network according to various embodiments of the present disclosure.

Referring to FIG. 1, the electronic device 101 may include a bus 110, a processor 120, a memory 130, an input/output interface 150, a display 160, and a communication interface 170. In some embodiments, the electronic device 101 may omit at least one of the above elements or may further include other elements. The bus 110 may include, for example, a circuit that interconnects the elements 120 to 170 and transfers communication (for example, control messages and/or data) between the elements. The processor 120 may include one or more of a CPU, an application processor (AP), and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an operating system (OS). The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, etc.) of the electronic device 101 to one or more of the application programs 147. The API 145 is an interface used by the application 147 to control a function provided from the kernel 141 or the middleware 143, and may include, for example, at least one interface or function (for example, an instruction) for a file control, a window control, image processing, a character control, or the like. For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a liquid crystal display (LCD), a light emitting diode (LED) display, an organic LED (OLED) display, a micro electro mechanical system (MEMS) display, or an electronic paper display. The display 160 may display, for example, various types of contents (for example, text, images, videos, icons, symbols, etc.) for a user. The display 160 may include a touch screen and may receive, for example, a touch, gesture, proximity, or hovering input using an electronic pen or the user's body part. The communication interface 170 may configure communication, for example, between the electronic device 101 and an external device (for example, a first external electronic device 102, a second external electronic device 104, or a server 106). For example, the communication interface 170 may use wireless communication 164 to communicate with the first external electronic device 102. Furthermore, the communication interface 170 may be connected to a network 162 through wireless or wired communication to communicate with the second external electronic device 104 or the server 106.

The wireless communication may include, for example, a cellular communication that uses at least one of long term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), and the like. According to an embodiment, the wireless communication may include, for example, at least one of Wi-Fi, Bluetooth, Bluetooth low energy (BLE), Zigbee, near field communication (NFC), magnetic secure transmission, radio frequency (RF), and body area network (BAN). According to an embodiment, the wireless communication may include a global navigation satellite system (GNSS). The GNSS may be, for example, a GPS, a global navigation satellite system (Glonass), a Beidou navigation satellite system (hereinafter, referred to as "Beidou"), or the European global satellite-based navigation system (Galileo). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), a plain old telephone service (POTS), and the like. The network 162 may include a telecommunications network, for example, at least one of a computer network (for example, a local area network (LAN) or a wide area network (WAN)), the Internet, and a telephone network.

Each of the first and second external electronic devices 102 and 104 may be of a type identical to or different from that of the electronic device 101. According to various embodiments, all or some of the operations executed by the electronic device 101 may be executed by another electronic device, a plurality of electronic devices (for example, the electronic devices 102 and 104), or the server 106. According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
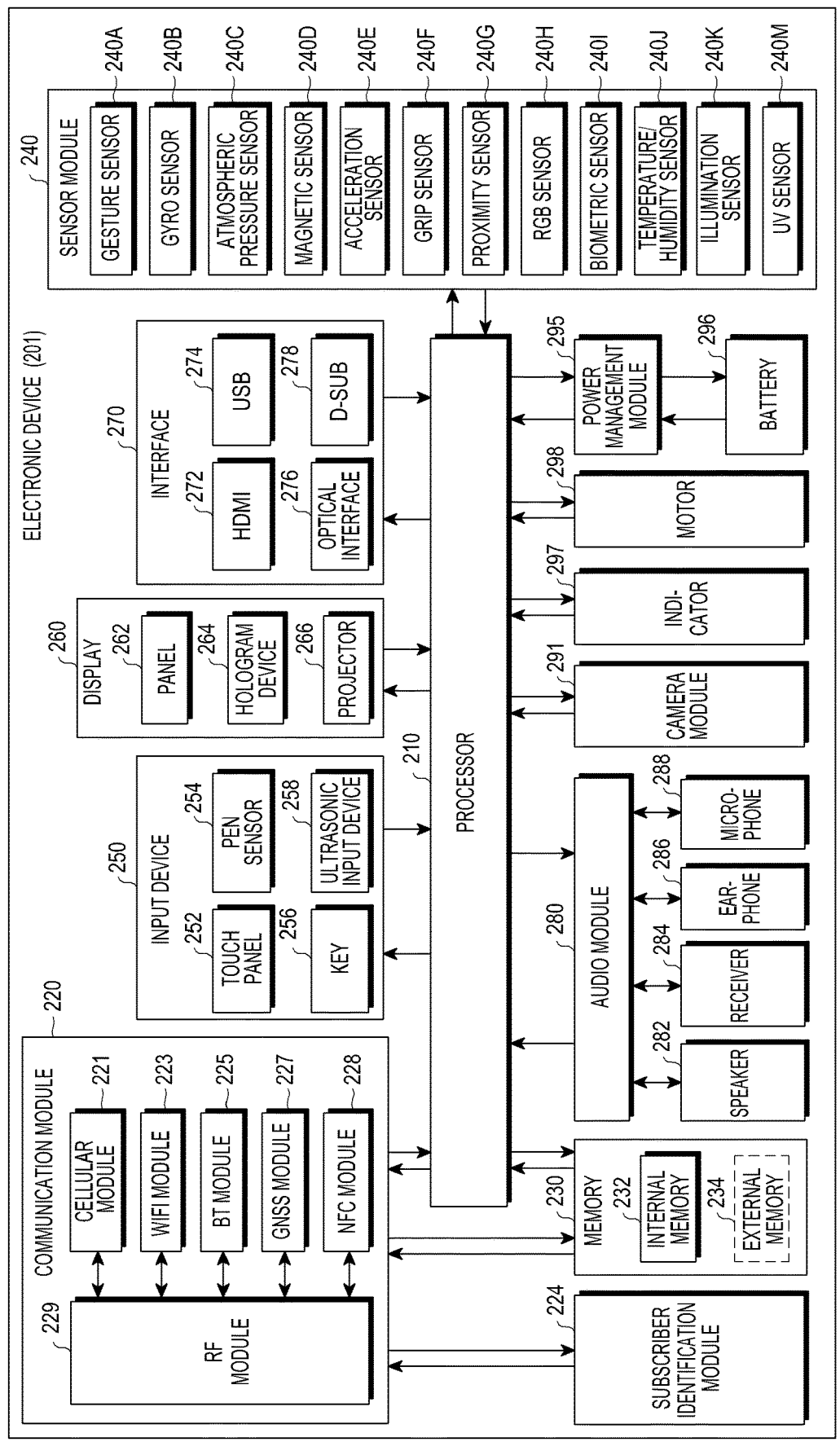
FIG. 2 is a block diagram of the electronic device according to various embodiments of the present disclosure.

FIG. 2 is a block diagram illustrating an electronic device 201 according to various embodiments of the present disclosure.

Referring to FIG. 2, the electronic device 201 may include, for example, the entirety or a part of the electronic device 101 illustrated in FIG. 1. The electronic device 201 may include at least one processor 210 (for example, an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected to the processor 210 by running, for example, an OS or an application program, and may perform processing and arithmetic operations of various types of data. The processor 210 may be embodied, for example, as a system on chip (SoC). According to an embodiment, the processor 210 may further include a graphic processing unit (GPU) and/or an image signal processor (ISP). The processor 210 may also include at least some of the elements illustrated in FIG. 2 (for example, a cellular module 221). The processor 210 may load, in a volatile memory, instructions or data received from at least one of the other elements (for example, communication module 220), process the loaded instructions or data, and store the result data in the memory 230.

The communication module 220 may have a configuration that is the same as or similar to that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, and the like through a communication network. According to an embodiment of the present disclosure, the cellular module 221 may identify or authenticate an electronic device in the communication network by using the SIM (for example, a SIM card) 224. According to an embodiment, the cellular module 221 may perform at least some of the functions that the processor 210 may provide. According to an embodiment, the cellular module 221 may include a CP. In some embodiments, at least some (two or more) of the cellular module 221, the Wi-Fi module 223, the Bluetooth module 225, the GNSS module 227, and the NFC module 228 may be included in a single integrated chip (IC) or IC package. The RF module 229 may transmit/receive, for example, a communication signal (e.g., an RF signal). The RF module 229 may include, for example, a transceiver, a power amp module (PAM), a frequency filter, a low noise amplifier (LNA), an antenna, and the like. According to another embodiment, at least one of the cellular module 221, the Wi-Fi module 223, the BT module 225, the GNSS module 227, and the NFC module 228 may transmit/receive an RF signal through a separate RF module. The SIM 224 may include, for example, a card that includes a subscriber identification module, or an embedded SIM, and may contain unique identification information (for example, an integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random access memory (DRAM), a static RAM (SRAM), a synchronous dynamic RAM (SDRAM), and the like) and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard disc drive, or a solid state drive (SSD)). The external memory 234 may include a flash drive, for example, a compact flash (CF), a secure digital (SD), a micro-SD, a mini-SD, an extreme digital (xD), a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer and may provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented integrally with the touch panel 252 or implemented by one or more sensors separated from the touch panel 252. The hologram device 264 may show a three-dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally, or alternatively, the interface 270 may, for example, include a mobile high-definition link (MHL) interface, a SD card/MMC interface, or an infrared data association (IrDA) standard interface.

The audio module 280 may bi-directionally convert, for example, a sound and an electric signal. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an ISP, or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may have a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part of the electronic device 201 (for example, the processor 210). The motor 298 may convert an electrical signal into a mechanical vibration and may generate a vibration, a haptic effect, and the like. The electronic device 201 may include a mobile TV support device that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device of the electronic device 201. According to various embodiments, the electronic device (e.g., the electronic device 201) does not include some elements or further include additional elements. Some of the elements therein may be coupled to constitute one object but the electronic device may perform the same functions as those which the corresponding elements are not coupled to each other.

Figure 3:
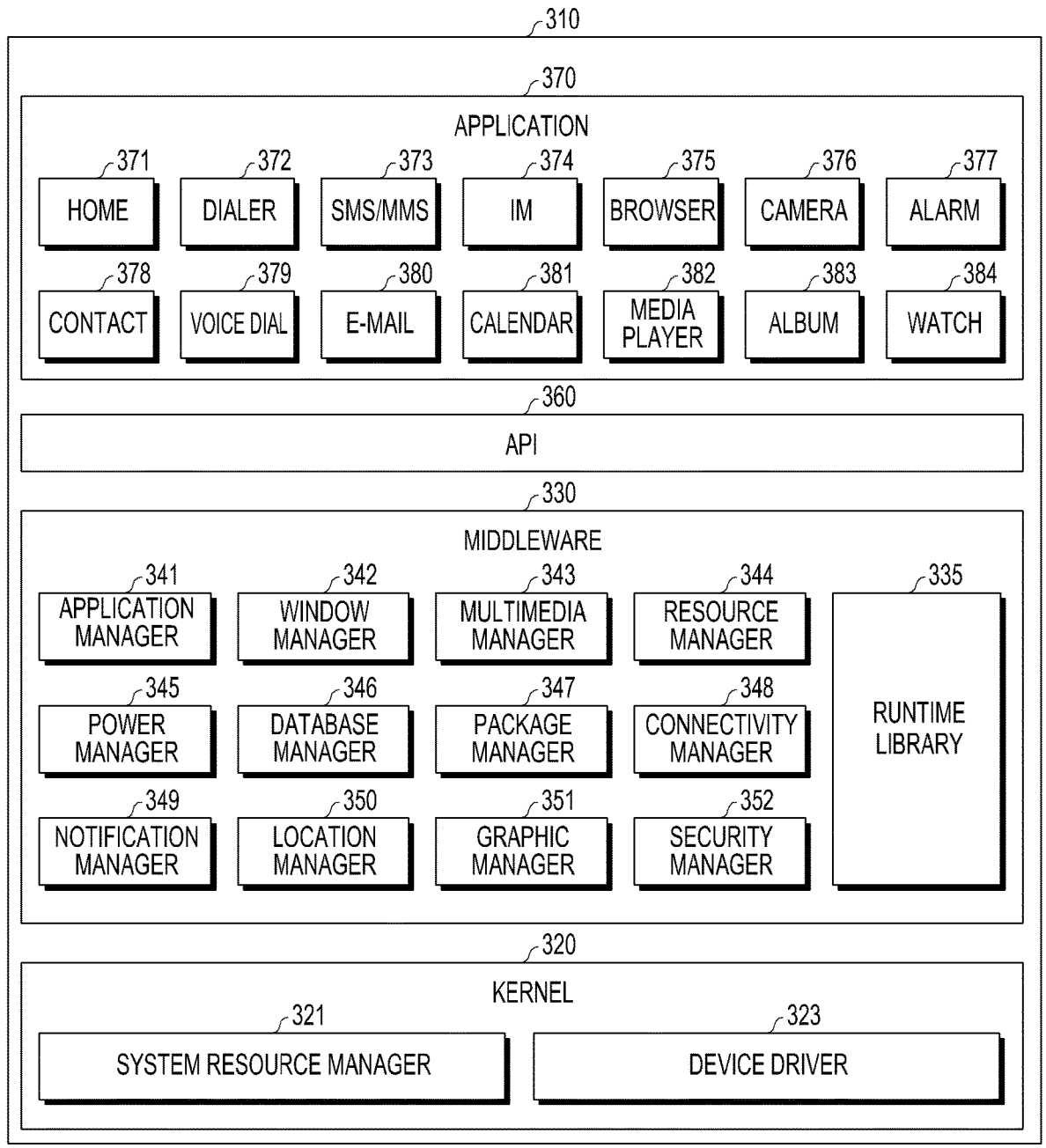
FIG. 3 is a block diagram of a program module according to various embodiments of the present disclosure.

FIG. 3 is a block diagram of a program module according to various embodiments of the present disclosure.

Referring to FIG. 3, according to an embodiment, the program module 310 (for example, the program 140) may include an OS for controlling resources related to the electronic device (for example, the electronic device 101) and/or various applications (for example, the application programs 147) executed in the OS. The OS may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least some of the program module 310 may be preloaded on the electronic device, or may be downloaded from an external electronic device (for example, the electronic device 102 or 104, or the server 106).

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source codes of the applications 370 or the space of a memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event (for example, an arrival message, an appointment, a proximity notification, and the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide a module specified for each type of the OS. Furthermore, the middleware 330 may dynamically remove some of the existing elements, or may add new elements. The API 360 is, for example, a set of API programming functions, and may be provided with different configurations according to OS. For example, in the case of Android™ or iOS™, one API set may be provided for each platform, and in the case of Tizen™, two or more API sets may be provided for each platform.

The applications 370 may include, for example, one or more applications that can perform functions, such as home 371, dialer 372, short message service (SMS)/multimedia messaging service (MMS) 373, instant message (IM) 374, browser 375, camera 376, alarm 377, contacts 378, voice dial 379, e-mail 380, calendar 381, media player 382, album 383, watch 384, and others such as for health care (for example, measuring exercise quantity or blood glucose), providing of environment information (for example, atmospheric pressure, humidity, or temperature information), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (for example, turning on/off the external electronic device itself (or some elements thereof) or adjusting the brightness (or resolution) of a display) or applications executed in the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

The term "module" used herein may include a unit consisting of hardware, software, or firmware, and may, for example, be used interchangeably with the term "logic", "logical block", "component", "circuit", or the like. The "module" may be an integrally configured element or may be a minimum unit that performs one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (for example, modules or functions thereof) or methods (for example, operations) according to various embodiments may be implemented by an instruction which is stored a computer-readable storage medium (for example, the memory 130) in the form of a program module. When the instruction executed by a processor (for example, the processor 120), the processor may perform a function corresponding to the instruction. The computer-readable storage medium may include a hard disk, a floppy disk, a magnetic medium (for example, a magnetic tape), an optical media (for example, compact disk-ROM (CD-ROM), DVD), a magneto-optical media (for example, a floptical disk), an inner memory, and the like. The instruction may include a code made by a complier or a code that can be executed by an interpreter. The programming module according to the present disclosure may include one or more of the aforementioned elements or may further include other additional elements, or some of the aforementioned elements may be omitted. Operations performed by the module, the program module, or another element according to various embodiments may be performed sequentially, in parallel, repeatedly, or heuristically, at least some operations may be performed in a different order or omitted, or another operation may be added.

In this specification, for convenience of the description, the "user's skin" used below may include the user's body such as blood vessels, tissue, and/or bones corresponding to the user's skin as well as the user's skin.

Figure 4:
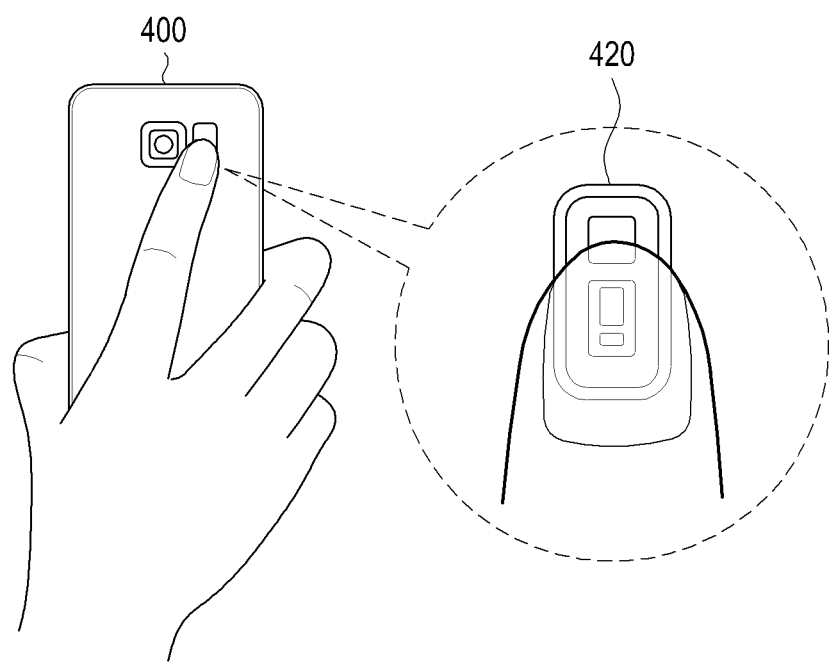
FIG. 4 is a block diagram schematically illustrating the electronic device according to various embodiments of the present disclosure.

FIG. 4 is a block diagram schematically illustrating an electronic device according to various embodiments of the present disclosure.

Referring to FIG. 4, an electronic device 400 may include a sensor module 420 that acquires biometric information from the user's skin. The electronic device 400 may be implemented to be substantially the same as or similar to the electronic device 101 described in FIG. 1 or the electronic device 201 described in FIG. 2.

According to some embodiments, the electronic device 400 may acquire biometric information from the user's skin through the sensor module 420. For example, when the sensor module 420 contacts the user's skin (for example, user's finger), the electronic device 400 may acquire the user's biometric information based on a signal detected by the sensor module 420.

The sensor module 420 may acquire (or detect) the biometric information from the user's skin. At this time, when the sensor module 420 contacts the user's skin or approaches user's skin within a preset distance, the sensor module 420 may acquire biometric information from the user's skin.

For example, when the sensor module 420 contacts the user's skin, the sensor module 420 may output a first light to the user's skin. The sensor module 420 may receive a second light (for example, an infrared light, a visible light, and/or an ultraviolet light) generated by the first light (for example, an infrared light, a visible light, and/or an ultraviolet light) reflected from the user's skin. At this time, the sensor module 420 may acquire user's biometric information based on the second light.

For example, the sensor module 420 may be implemented as a photoplethysmography (PPG) sensor.

The electronic device 400 may acquire biometric information through the sensor module 420 and provide the user with the biometric information and health information corresponding to the biometric information.

The biometric information may refer to information including a heart rate, blood oxygen saturation, a skin hydration degree, skin elasticity, and/or a fatigue degree of the user.

The health information may refer to information on user's body health generated based on the biometric information.

According to some embodiments, the electronic device 400 may determine whether a current state corresponds to a state in which the biometric information can be acquired from the user's skin (for example, user's finger) through the sensor module 420. For example, in order to acquire accurate biometric information, the electronic device 400 may determine whether the sensor module 420 contacts the user's skin.

Meanwhile, for convenience of the specification, it is assumed that the user's skin corresponds to the user's finger. However, the technical idea of the present disclosure is not limited thereto, and the user's skin may include at least one of the user's body parts. For example, when the electronic device 400 is implemented as a wearable device, the user's skin may refer to a wrist or back of the hand of the user.

Figure 5:
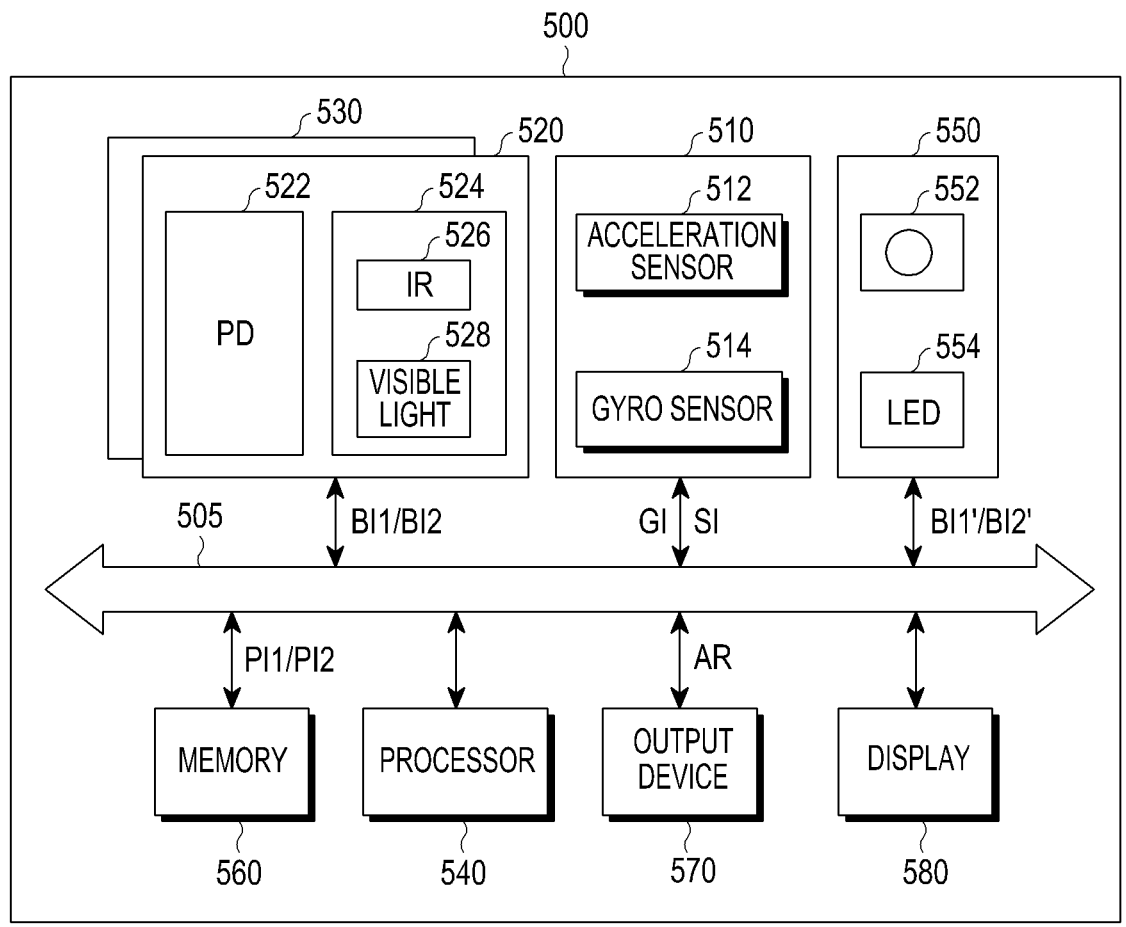
FIG. 5 is a block diagram illustrating the electronic device of FIG. 4 in detail according to various embodiments of the present disclosure.

FIG. 5 is a block diagram illustrating the electronic device of FIG. 4 in detail according to various embodiments of the present disclosure.

Referring to FIG. 5, an electronic device 500 may include a first sensor module 510, a second sensor module 520, a touch sensor 530, a processor 540, a camera module 550, a memory 560, an output device 570, and a display 580.

Each of the elements 510, 520, 530, 540, 550, 560, 570, and 580 of the electronic device 500 may transmit and receive data through a bus 505. For example, the bus 505 may be implemented to be substantially the same as or similar to the bus 110 described in FIG. 1.

The electronic device 500 may be implemented to be substantially the same as or similar to the electronic device 400 described in FIG. 4. For example, the electronic device 500 may acquire biometric information from the user's skin and provide the user with the biometric information and health information corresponding to the biometric information.

The first sensor module 510 may detect a user's gesture. Further, the first sensor module 510 may detect the user's gesture and transmit gesture information (GI) corresponding to the detected gesture to the processor 540.

The GI may refer to information indicating a user's gesture for the electronic device 400 detected by the first sensor module 510. For example, when the user overturns the electronic device 400 180 degrees, the GI may include information on the changed phase of 180 degrees of the electronic device 400. Further, when the user generates a predetermined motion for the electronic device 400, the GI may include information indicating the user's motion for the electronic device 400.

For example, the first sensor module 510 may include an acceleration sensor 512 and a gyro sensor 514. In addition, the first sensor module 510 may further include a sensor that may detect a user's gesture.

The first sensor module 510 may determine whether a current state corresponds to a state in which biometric information (BI1 and/or BI2) can be acquired from the user's skin. For example, the first sensor module 510 may determine a motion degree of the electronic device 400 through at least one of the acceleration sensor 512 and the gyro sensor 514. That is, the first sensor module 510 may determine whether the motion degree is in a state where the biometric information (BI1 and/or BI2) can be acquired from the user's skin. At this time, the motion degree of the electronic device 400 may refer to a motion degree of the electronic device 400 by the user (for example, a speed, acceleration and/or a location change).

According some embodiments, the first sensor module 510 may transmit state information (SI) indicating a state where the biometric information can be acquired from the user's skin to the processor 540.

For example, the SI may include information on a motion degree of the electronic device 400. Further, the SI may include information indicating whether a current state corresponds to a state in which the biometric information (BI1 and/or BI2) can be smoothly acquired from the user's skin.

The second sensor module 520 may acquire (or measure) first biometric information (BI1) and second biometric information (BI2) from the user's skin. Further, the second sensor module 520 may transmit the first biometric information (BI1) and the second biometric information (BI2) to the processor 540.

For example, the first biometric information (BI1) may refer to information indicating whether the user's skin contacts the second sensor module 520. At this time, the first biometric information (BI1) may include information on the body acquired from the user's skin.

The second biometric information (BI2) may refer to information on a user's body state acquired from the user's skin. For example, the second biometric information (BI2) may refer to information including a heart rate, blood pressure, blood oxygen saturation, skin hydration degree, skin elasticity, stress information, and/or fatigue degree of the user.

The second sensor module 520 may include a light receiving unit 522 (for example, photodiode (PD)) and a light emitting unit 524. For example, the second sensor module 520 may be implemented as a PPG sensor.

The light emitting unit 524 may be implemented as a light output device. For example, the light emitting unit 524 may include a LED.

The light emitting unit 524 may include an infrared output unit 526 and a visible light (VL) output unit 528. For example, each of the infrared output unit 526 and the visible light output unit 528 may include the LED.

The second sensor module 520 may output an infrared light from the infrared output unit 526 and output a visible light from the visible light output unit 528 according to a control of the processor 540. For example, the visible light output unit 528 may output a red light or a green light.

According to some embodiments, the infrared output unit 526 may output an infrared light in order to acquire the first biometric information. Further, the visible light output unit 528 may output a visible light in order to acquire the second biometric information or inform the user of a state in which the second biometric information can be acquired.

The light receiving unit 522 may receive a light generated by the infrared light output from the infrared output unit 526, which is reflected from the user's skin. Further, the light receiving unit 522 may receive a light generated by the visible light output from the visible light output unit 528, which is reflected from the user's skin. At this time, the light receiving unit 522 may measure a current (or voltage) corresponding to the received light and acquire the first biometric information (BI1) based on the measured current (or voltage).

According to some embodiments, the second sensor module 520 may acquire the first biometric information (BI1) by using the light generated by the infrared light output from the infrared output unit 526, which is reflected from the user's skin.

According to some embodiments, the second sensor module 520 (for example, the light receiving unit 522) may acquire the second biometric information (BI2) by using the light generated by the infrared light output from the infrared output unit 526, which is reflected from the user's skin. Further, the second sensor module 520 (for example, the light receiving unit 522) may acquire the second biometric information (BI2) by using the light generated by the visible light output from the visible light output unit 528, which is reflected from the user's skin. At this time, the second sensor module 520 (for example, the light receiving unit 522) may acquire the second biometric information (BI2) by using the light generated by the infrared light output from the infrared output unit 526, which is reflected from the user's skin and the light generated by the visible light output from the visible light output unit 528, which is reflected from the user's skin.

The touch sensor 530 may detect a touch by the user. When the touch by the user is detected for a predetermined time or longer, the touch sensor 530 may transmit touch information to the processor 540. At this time, the touch information may refer to information indicating that the touch by the user is detected.

For example, the touch sensor 530 may be implemented outside the second sensor module 520. Further, the touch sensor 530 may be included (or embedded) in the second sensor module 520.

The processor 540 may control an overall operation of the electronic device 500.

According to some embodiments, the processor 540 may operate the second sensor module 520 in response to the GI received from the first sensor module 510.

The processor 540 may compare the GI with preset GI (PI1) stored in the memory 560 and operate the second sensor module 520 according to a result of the comparison. For example, when the preset GI (PI1) is a user's specific motion for the electronic device 500, the processor 540 may determine whether the GI is the same as (or similar to) the specific motion.

When the GI is the same as (or similar to) the preset GI (PI1), the processor 540 may operation the second sensor module 520 in order to acquire the first biometric information (BI1). For example, the processor 540 may output an infrared light from the second sensor module 520.

The preset GI (PI1) may refer to information for operating a particular application by the processor 540. At this time, the particular application may refer to an application for acquiring biometric information from the user's skin and providing the acquired biometric information to the user. Further, the preset GI (PI1) may be set by the user or the processor 540.

When the GI is the same as (or similar to) the preset GI (PI1), the processor 540 may acquire the first biometric information (BI1) through the second sensor module 520.

Meanwhile, when the touch information is received from the touch sensor 530, the processor 540 may operate the second sensor module 520 in order to acquire the first biometric information (BI1). For example, when the user touches the touch sensor 530, the processor 540 may output an infrared light from the second sensor module 520. That is, the processor 540 may determine whether the second sensor module 520 operates through the touch sensor 530 instead of determining whether the GI is the same as (or similar to) the PI1.

According to some embodiments, when the GI is the same as the preset GI (PI1), the processor 540 may execute an application. Further, when a touch is generated on the touch sensor 530 by the user for a predetermined time or longer, the processor 540 may execute the application. At this time, the application may be an application that acquires the biometric information (BI1 and/or BI2) from the user's skin and provides the acquired biometric information (BI1 and/or BI2) to the user.

Hereinafter, for convenience of the description, it is assumed that an operation of controlling the electronic device 500 by the application corresponds to an operation of controlling the electronic device 500 by the processor 540.

The processor 540 may determine whether the user's skin (for example, user's finger) contacts the second sensor module 520 based on the first biometric information (BI1) acquired from the second sensor module 520.

The processor 540 may compare the first biometric information (BI1) with preset biometric information (PI2) and determine whether the user's skin contacts the second sensor module 520 according to a result of the comparison.

For example, the preset biometric information (PI2) may refer to information on a particular signal (or a waveform of the particular signal) generated by the user' skin.

According to some embodiments, the processor 540 may compare a waveform, a peak point of the waveform, and/or a pattern of the waveform of the first biometric information (BI1) with a waveform, a peak point of the waveform, and/or a pattern of the waveform of the preset biometric information (PI2). The processor 540 may determine whether the user's skin contacts the second sensor module 520 according to a result of the comparison.

According to some embodiments, when the first biometric information (BI1) is the same as (or similar to) the preset biometric information (PI2), the processor 540 may determine that the user's skin contacts the second sensor module 520. Further, when the first biometric information (BI1) is not the same as (or similar to) the preset biometric information (PI2), the processor 540 may determine that the user's skin does not contact the second sensor module 520.

When the first biometric information (BI1) is the same as (or similar to) the preset biometric information (PI2), the processor 540 may acquire the second biometric information (BI2) through the second sensor module 520. Further, when the first biometric information (BI1) is not the same as (or similar to) the preset biometric information (PI2), the processor 540 may turn off the output of the infrared light from the second sensor module 520.

According to some embodiments, the processor 540 may determine the second biometric information (BI2) through the second sensor module 520 based on SI received from the first sensor module 510.

When the SI indicates that the second biometric information (BI2) cannot be accurately determined, the processor 540 may provide an alarm to the user through the output device 570 and/or the display 580. At this time, the alarm may refer to information that informs the user that the second biometric information (BI2) cannot be accurately acquired. For example, the processor 540 may transmit alarm information (AR) to the output device 570 in order to provide the alarm to the user.

When the SI indicates that the second biometric information (BI2) can be accurately determined, the processor 540 may acquire the second biometric information (BI2) through the second sensor module 520.

Meanwhile, the processor 540 may control the second sensor module 520 to output a visible light to acquire the second biometric information (BI2). For example, when the second biometric information (BI2) corresponds to blood oxygen saturation of the user, the infrared light and the visible light from the second sensor module 520 should be output to the user's skin. Accordingly, in order to acquire the second biometric information (BI2) (for example, blood oxygen saturation), the processor 540 may output the visible light from the second sensor module 520.

For example, when the second biometric information (BI2) corresponds to a heart rate of the user, one of the infrared light and the visible light from the second sensor module 520 should be output to the user's skin to acquire the second biometric information (BI2). Accordingly, in order to acquire the second biometric information (BI2) (for example, the heart rate), the processor 540 may selectively output the infrared light or the visible light from the second sensor module 520.

The processor 540 may provide the second biometric information (BI2) to the user through the display 580. Further, the processor 540 may generate health information of the user's body based on the second biometric information (BI2) and provide the user with the health information through the display 580.

Meanwhile, the processor 540 may perform an operation of detecting a user's gesture through the first sensor module 510 in a background state. Further, the processor 540 may perform an operation of determining whether the user's skin contacts the second sensor module 520 through the second sensor module 520 and an operation of acquiring (or measuring) the second biometric information (BI2) through the second sensor module 520 in the background state.

The camera module 550 may acquire a first biometric image (BI1') and a second biometric image (BI2') from the user's skin. Further, the camera module 550 may transmit the first biometric image (BI1') and the second biometric image (BI2') to the processor 540. At this time, the first biometric image (BI1') and the second biometric image (BI2') may be implemented to be substantially similar to the first biometric information (BI1) and the second biometric information (BI2), respectively.

According to some embodiments, the camera module 550 may include a light receiving unit 552 and a light emitting unit 554.

The light receiving unit 552 may be implemented as an image sensor of the camera. The light receiving unit 552 may perform substantially the same function as that of the light receiving unit 522 of the second sensor module 520. Further, the light emitting unit 554 may perform substantially the same function as that of the light emitting unit 524 of the second sensor module 520.

For example, the camera module 550 may acquire the first biometric image (BI1') based on a light signal reflected from the user's skin through the light receiving unit 552. At this time, the light signal output from the user's skin corresponding to the light signal reflected from the user's skin may be implemented as a natural light or a light signal output from the light emitting unit 554.

However, the first biometric image (BI1') may not include only a light signal of a particular color (for example, red or green). Accordingly, when the first biometric image (BI1') does not include only the light signal of the particular color (for example, red or green), the processor 540 may filter the first biometric image (BI1').

For example, the processor 540 may detect information on the particular color of the first biometric image (BI1') by using a filter (for example, a band pass filter) that may detect only the particular color. At this time, information on the particular color in the first biometric image (BI1') may be implemented to be substantially the same as the first biometric information (BI1).

The processor 540 may compare the information on the particular color in the first biometric image (BI1') with preset biometric information (PI2) and determine whether the user's skin contacts the camera module 550 according to a result of the comparison.

Further, the camera module 550 may acquire the second biometric image (BI2') from the user's skin.

However, similar to the first biometric image (BI1'), the second biometric image (BI2') may also not include only a light signal of a particular color (for example, red or green). Accordingly, when the second biometric image (BI2') does not include only the light signal of the particular color (for example, red or green), the processor 540 may filter the second biometric image (BI2').

For example, the processor 540 may detect information on the particular color of the second biometric image (BI2') by using a filter (for example, a band pass filter) that may detect only the particular color.

The processor 540 may acquire three second biometric information (BI2) based on the information on the particular color in the second biometric image (BI2'). That is, the information on the particular color in the second biometric image (BI2') may be implemented to be substantially the same as the second biometric information (BI2).

Meanwhile, the processor 540 may perform an operation of determining whether the user's skin contacts the camera module 550 through the camera module 550 and an operation of acquiring (or measuring) the second biometric information (BI2) through the camera module 550 in the background state.

The memory 560 may store the preset GI (PI1) and the preset biometric information (PI2). The memory 560 may transmit the preset GI (PI1) and the preset biometric information (PI2) to the processor 540 according to a control of the processor 540.

The memory 560 may be implemented as a non-volatile memory. For example, the memory 560 may be implemented as a flash memory.

The output device 570 may provide an alarm to the user in response to alarm information (AR) transmitted from the processor 540.

According to some embodiments, the output device 570 may provide an alarm to the user by using at least one of a sound, a vibration, a light signal, and smell in response to the alarm information (AR).

For example, the output device 570 may provide the user with a state in which the second biometric information (BI2) is measured (or acquired) through an alarm by using at least one of visual information, auditory information, smell information, and tactile information. Further, the output device may provide the user with a state in which the second biometric information (BI2) cannot be measured (or acquired) through an alarm by using at least one of visual information, auditory information, smell information, and tactile information.

For example, the output device 570 may include at least one of a vibration device, a speaker, an air freshener, and a light emitting device.

The display 580 may display the second biometric information (BI2) according to a control of the processor 510. Further, the display 580 may display health information of the user's body generated based on the second biometric information (BI2).

The electronic device 500 may further include a communication module (not shown). For example, the processor 540 may transmit the second biometric information (BI2) to another electronic device through the communication module.

An electronic device according to various embodiments of the present disclosure may include: a memory; a first sensor module configured to detect a gesture; a second sensor module configured to measure biometric information; and a processor, wherein the processor may acquire first biometric information through the second sensor module in response to the gesture, determine whether a user's skin contacts the second sensor module based on the first biometric information, and acquire second biometric information from the user's skin according to a result of the determination.

The processor may compare the gesture with a preset gesture stored in the memory and output an infrared light from the second sensor module in order to acquire the first biometric information according to a result of the comparison.

The processor may determine whether the user's skin contacts the second sensor module by acquiring the first biometric information from the user's skin through the second sensor module and comparing the first biometric information with the preset biometric information stored in the memory.

The processor may determine whether the user's skin contacts the second sensor module based on at least one of a waveform of the first biometric information, a peak point of the waveform, and a pattern of the waveform.

The processor may determine whether the second sensor module is in a state where the second biometric information can be acquired through the first sensor module and acquire the second biometric information according to a result of the determination.

The processor may determine whether the user's skin contacts the second sensor module based on an infrared light output from the second sensor module.

When the user's skin contacts the second sensor module, the processor may output a visible light from the second sensor module and acquire the second biometric information based on at least one of the infrared light and the visible light.

The electronic device may further include a camera module, and the processor may acquire the first biometric information from the user's skin through the camera module and determine whether the user's skin contacts the second sensor module based on the first biometric information.

Figure 6:
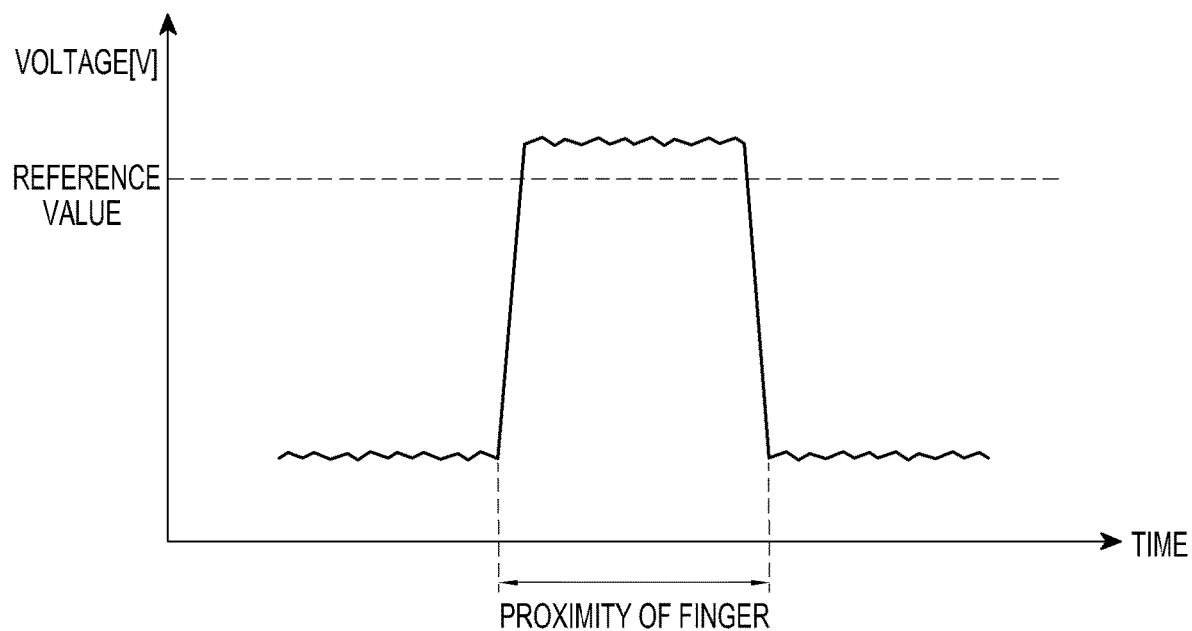
FIG. 6 is a graph illustrating a change in a voltage for an object that contacts a sensor module according to various embodiments of the present disclosure.

FIG. 6 is a graph illustrating a change in a voltage for an object that contacts the sensor module according to various embodiments of the present disclosure.

Referring to FIGS. 5 and 6, the electronic device 500 may determine whether the user's skin (for example, user's finger) contacts (or grasps) the second sensor module 520.

According some embodiments, an operation of determining whether the user's skin contacts the second sensor module 520 by the electronic device 500 may include an operation of recognizing the user's skin (for example, user's finger) by the electronic device 500 through the second sensor module 520.

When the object is in proximity to the second sensor module 520, the infrared light output from the light emitting unit 524 of the second sensor module 520 may be reflected from the object and received by the light receiving unit 522. The light receiving unit 522 may generate a current as the reflected infrared light is received. At this time, a DC voltage corresponding to the current generated by the light receiving unit 522 may be changed.

According to some embodiments, the electronic device 500 may determine whether the object in proximity to the second sensor module 520 is the user's skin (for example, user's finger) based on a change in the DC voltage.

The graph illustrated in FIG. 6 indicates the DC voltage corresponding to the current generated by the light receiving unit 522.

For example, when the change in the DC voltage is larger than or equal to a reference value, it may be determined that the object in proximity to the second sensor module 520 is the user's skin. In contrast, when the change in the DC voltage is equal or smaller than the reference value, it may be determined that the object in proximity to the second sensor module 520 is not the user's skin. At this time, the reference value may be set by the user or the processor 540.

Figure 7A:
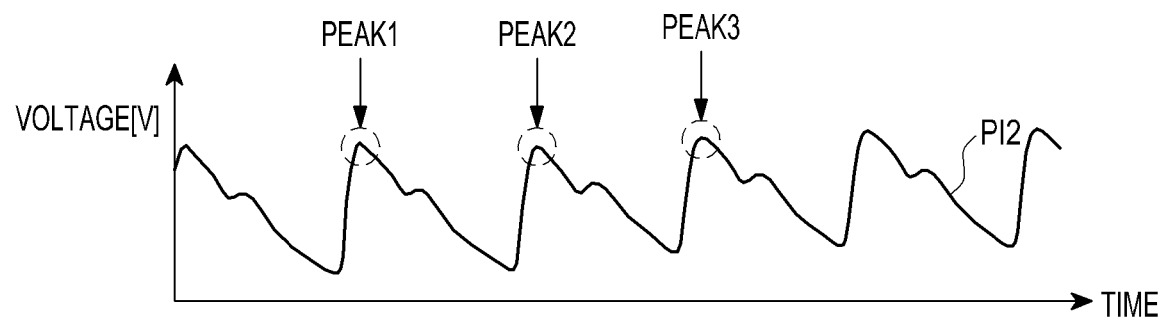
FIGS. 7A and 7B are graphs illustrating an operation of determining whether the user's skin contacts the sensor module based on first biometric information acquired from the sensor module according to various embodiments of the present disclosure.
Figure 7B:
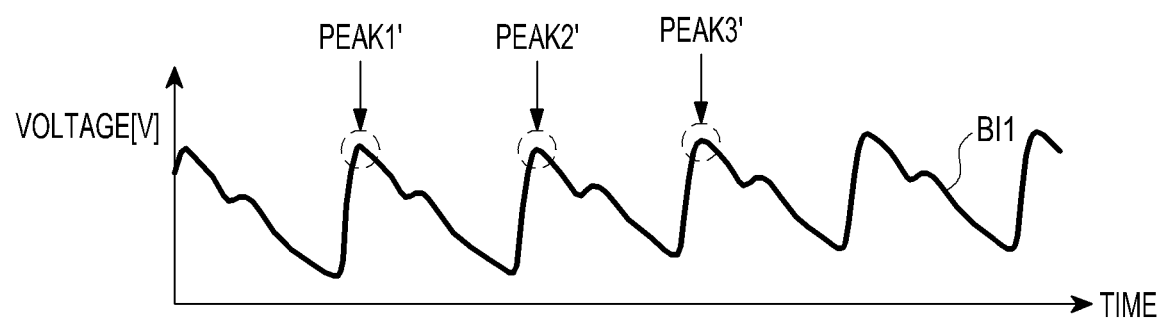

FIGS. 7A and 7B are graphs illustrating an operation of determining whether the user's skin contacts the sensor module based on first biometric information acquired from the sensor module according to various embodiments of the present disclosure.

Referring to FIGS. 5, 6, 7A, and 7B, the processor 540 may compare the first biometric information (BI1) and the preset biometric information (PI2), and determine whether the user's skin contacts the second sensor module 520 according to a result of the comparison.

According to some embodiments, the processor 540 may compare a waveform, a peak point of the waveform, and/or a pattern of the waveform of the first biometric information (BI1) with a waveform, a peak point of the waveform, and/or a pattern of the waveform of the preset biometric information (PI2). The processor 540 may determine whether the user's skin contacts the second sensor module 520 according to a result of the comparison.

The graph illustrated in FIG. 7A indicates the preset biometric information (PI). Further, the graph illustrated in FIG. 7B indicates the first biometric information (BI1).

According to an embodiment, the processor 540 may compare a waveform of the first biometric information (BI1) and a waveform of the preset biometric information (PI2). For example, it is determined that a shape or form of the waveform of the first biometric information (BI1) is the same as (or similar to) a shape or form of the waveform of the preset biometric information (PI2), the processor 540 may determine that the user's skin contacts the second sensor module 520.

According to another embodiment, the processor 540 may compare peak points (PEAK1', PEAK2', and PEAK3') of the waveform of the first biometric information (BI1) with peak points (PEAK1, PEAK2, and PEAK3) of the waveform of the preset biometric information (PI2). For example, it is determined that positions, distribution, and/or patterns of the peak points (PEAK1', PEAK2', and PEAK3') of the first biometric information (BI1) are the same as (or similar to) positions, distribution, and/or patterns of the peak points (PEAK1, PEAK2, and PEAK3) of the preset biometric information (PI2), the processor 540 may determine that the user's skin contacts the second sensor module 520.

According to yet another embodiment, the processor 540 may compare the pattern of the waveform of the first biometric information (BI1) with the pattern of the waveform of the preset biometric information (PI2). For example, it is determined that the pattern of each waveform of the first biometric information (BI1) is the same as (or similar to) the pattern of each waveform of the preset biometric information (PI2), the processor 540 may determine that the user's skin contacts the second sensor module 520.

Meanwhile, the processor 540 may determine that the user's skin contacts the second sensor module 520 based on an interval between the peak points (PEAK1', PEAK2', and PEAK3') of the waveform of the first biometric information (BI1), a slope of the waveform, and distribution (or pattern) of the peak points (PEAK1', PEAK2', and PEAK3') of the waveform. That is, the processor 540 may determine whether the user's skin contacts the second sensor module 520 by analyzing the interval between the peak points (PEAK1', PEAK2', and PEAK3') of the waveform of the first biometric information (BI1), the slope of the waveform, the distribution of the peak points (PEAK1', PEAK2', and PEAK3') of the waveform and/or the pattern of the waveform without reading the preset biometric information (PI2) from the memory 560.

Figure 8:
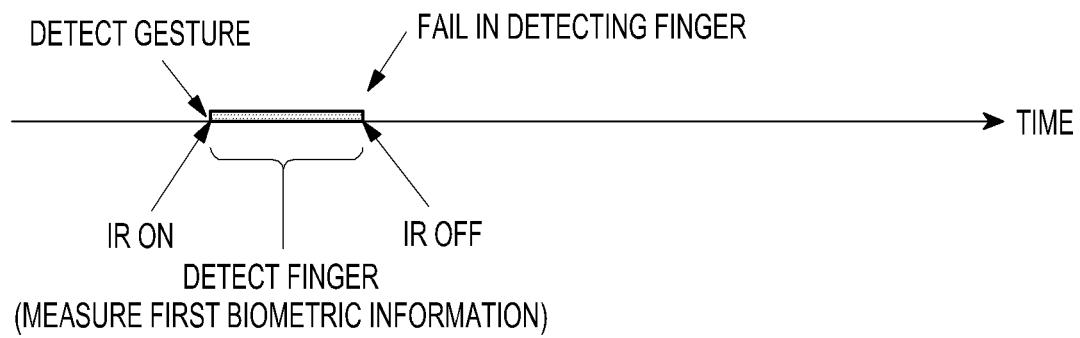
FIG. 8 is a time flow illustrating an operation of the electronic device according to various embodiments of the present disclosure.

FIG. 8 is a time flow illustrating an operation of the electronic device according to various embodiments of the present disclosure.

Referring to FIGS. 5, 6, 7A, 7B, and 8, the processor 540 may detect a user's gesture through the first sensor module 510.

When GI is the same as preset GI (PI1), the processor 540 may output an infrared light from the second sensor module 520.

The processor 540 may detect the user's skin (for example, user's finger) based on the infrared light output from the second sensor module 520. For example, the processor 540 may acquire (or measure) first biometric information (BI1) based on the infrared light output from the second sensor module 520 and determine whether the user's skin (for example, user's finger) contacts (grasps) the second sensor module 520 based on the first biometric information (BI1).

When the user's skin (for example, user's finger) is not detected, the processor 540 may turn off the output of the infrared light from the second sensor module 520. For example, when the user's skin (for example, user's finger) does not contact (or grasps) the second sensor module 520, the processor 540 may control the second sensor module 520 to turn off the output of the infrared light.

Figure 9:
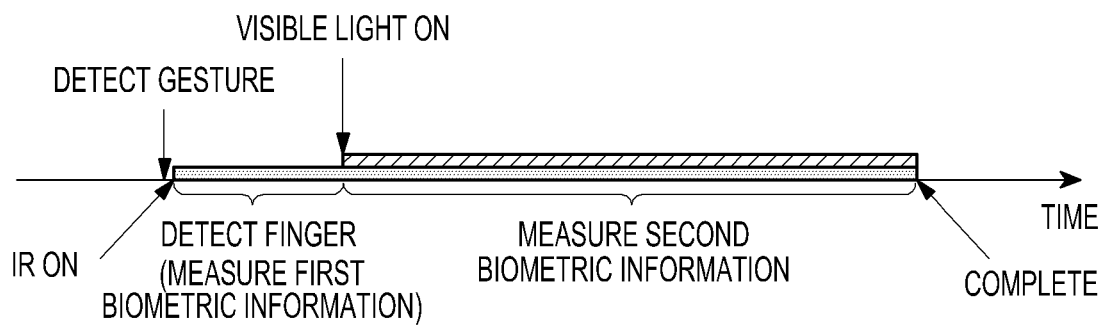
FIG. 9 is a time flow illustrating an operation of the electronic device according to various embodiments of the present disclosure.

FIG. 9 is a time flow illustrating an operation of the electronic device according to various embodiments of the present disclosure.

Referring to FIGS. 5, 6, 7A, 7B, 8, and 9, the processor 540 may detect a user's gesture through the first sensor module 510.

When GI is the same as preset GI (PI1), the processor 540 may output an infrared light from the second sensor module 520.

The processor 540 may detect the user's skin (for example, user's finger) based on the infrared light output from the second sensor module 520. For example, the processor 540 may acquire (or measure) first biometric information (BI1) based on the infrared light output from the second sensor module 520 and determine whether the user's skin (for example, user's finger) contacts (or grasps) the second sensor module 520 based on the first biometric information (BI1).

When the user's skin (for example, user's finger) is detected, the processor 540 may output a visible light (for example, red light) from the second sensor module 520. For example, when the user's skin (for example, user's finger) contacts (or grasps) the second sensor module 520, the processor 540 may control the second sensor module 520 to output the visible light (for example, red light). At this time, the processor 540 may control the second sensor module 520 to maintain the output of the infrared light. However, the processor 540 may selectively output the visible light (for example, red light) from the second sensor module 520 while maintaining the output of the infrared light.

The processor 540 may acquire (or measure) second biometric information (BI2) based on at least one of the infrared light and the visible light (for example, red light) output from the second sensor module 520. At this time, the processor 540 may inform the user of a state in which the second biometric information (BI2) is being acquired (or measured) through the output device 570 and/or the display 580.

When the acquisition (or measurement) of the second biometric information (BI2) is completed, the processor 540 may provide the second biometric information (BI2) to the user through the display 580.

Figure 10:
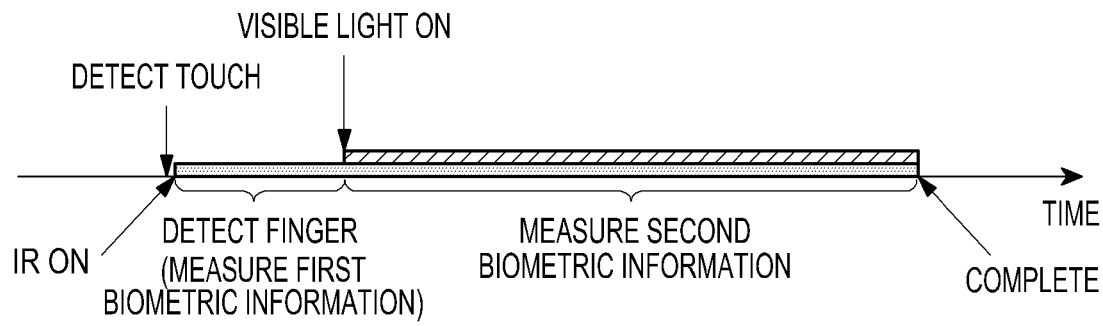
FIG. 10 is a time flow illustrating an operation of the electronic device according to various embodiments of the present disclosure.

FIG. 10 is a time flow illustrating an operation of the electronic device according to various embodiments of the present disclosure.

Referring to FIGS. 5, 6, 7A, 7B, and 8 to 10, the processor 540 may detect a user's touch through the touch sensor 530. For example, when the user's touch on the touch sensor 530 is generated for a predetermined time, the processor 540 may output an infrared light from the second sensor module 520.

Meanwhile, when the electronic device 500 includes the first sensor module 510 and the touch sensor 530, the processor 540 may output the infrared light from the second sensor module 520 based on at least one of GI and touch information. That is, the processor 540 may acquire biometric information from the user's skin based on at least one of the GI and the touch information and execute an application that provides the acquired biometric information to the user.

When the touch on the touch sensor 530 is detected for a predetermined time, the processor 540 may detect the user's skin (for example, user's finger) based on the infrared light output from the second sensor module 520. For example, the processor 540 may acquire (or measure) first biometric information (BI1) based on the infrared light output from the second sensor module 520 and determine whether the user's skin (for example, user's finger) contacts (or grasps) the second sensor module 520 based on the first biometric information (BI1).

When the user's skin (for example, user's finger) is detected, the processor 540 may output a visible light (for example, red light) from the second sensor module 520. For example, when the user's skin (for example, user's finger) contacts (or grasps) the second sensor module 520, the processor 540 may control the second sensor module 520 to output the visible light (for example, red light). At this time, the processor 540 may control the second sensor module 520 to maintain the output of the infrared light. However, the processor 540 may selectively output the visible light (for example, red light) from the second sensor module 520 while maintaining the output of the infrared light.

Meanwhile, when the touch sensor is included in the second sensor module 520, the processor 540 may determine whether the user's skin (for example, user's finger) contacts (or grasps) the second sensor module 520 through the touch sensor 530.

The processor 540 may acquire (or measure) second biometric information (BI2) based on at least one of the infrared light and the visible light (for example, red light) output from the second sensor module 520. At this time, the processor 540 may inform the user of a state in which the second biometric information (BI2) is being acquired (or measured) through the output device 570 and/or the display 580.

When the acquisition (or measurement) of the second biometric information (BI2) is completed, the processor 540 may provide the second biometric information (BI2) to the user through the display 580.

Figure 11:
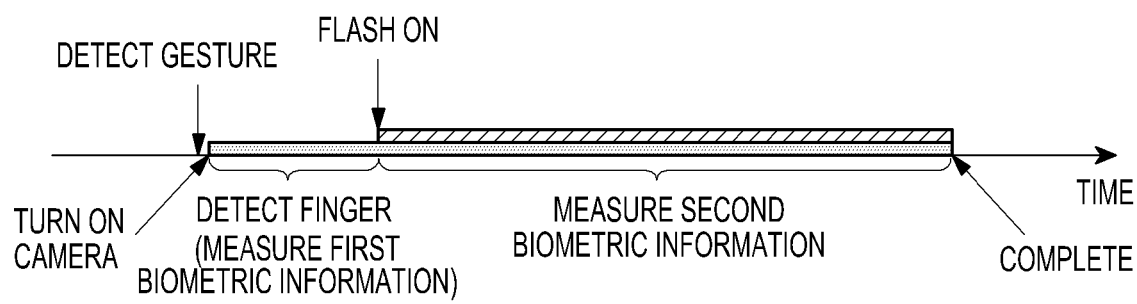
FIG. 11 is a time flow illustrating an operation of the electronic device according to various embodiments of the present disclosure.

FIG. 11 is a time flow illustrating an operation of the electronic device according to various embodiments of the present disclosure.

Referring to FIGS. 5, 6, 7A and 7B, and 8 to 11, the processor 540 may detect a user's gesture through the first sensor module 510. For example, when the GI is the same as the preset GI (PI1), the processor 540 may operate the camera module 550.

The processor 540 may detect the user's skin (for example, user's finger) based on the natural light or the light output from the camera module 550. For example, the processor 540 may acquire (or measure) the first biometric image (BI1') based on the nature light or the light output form the camera module 550 and determine whether the user's skin (for example, user's finger) contacts (or grasps) the second sensor module 520 based on the first biometric image (BI1'). At this time, the processor 540 may filter the first biometric image (BI1') by information on a particular color in the first biometric image (BI1') and determine whether the user's skin (for example, user's finger) contacts (or grasps) the second sensor module 520 based on the information on the particular color in the first biometric image (BI1'). Meanwhile, the processor 540 may acquire the first biometric information (BI1) based on the information on the particular color in the first biometric image (BI1').

When the user's skin (for example, user's finger) is detected, the processor 540 may output the visible light (for example, flash) from the light emitting unit 554 of the camera module 550. For example, when the user's skin (for example, user finger) contacts (or grasps) the second sensor module 520, the processor 540 may control the camera module 550 to output the visible light (for example, flash). At this time, the processor 540 may output the visible light when the first biometric image (BI1') is acquired using the natural light. That is, if the visible light output from the camera module 550 is used when the first biometric image (BI1') is acquired, the processor 540 may control the camera module 550 to maintain the output of the visible light.

The processor 540 may acquire (or measure) the second biometric image (BI2') based on the visible light output from the camera module 550. At this time, the processor 540 may filter the second biometric image (BI2') by information on a particular color in the second biometric image (BI2').

The processor 540 may inform the user of a state in which the second biometric image (BI2') and/or the information on the particular color in the second biometric image (BI2') is being acquired (or measured) through the output device 570 and/or the display 580.

When the acquisition (or measurement) of the information on the particular color in the second biometric image (BI2') is completed, the processor 540 may acquire the second biometric information (BI2) based on the information on the particular color in the second biometric image (BI2'). At this time, the processor 540 may provide the second biometric information (BI2) to the user through the display 580.

Figure 12:
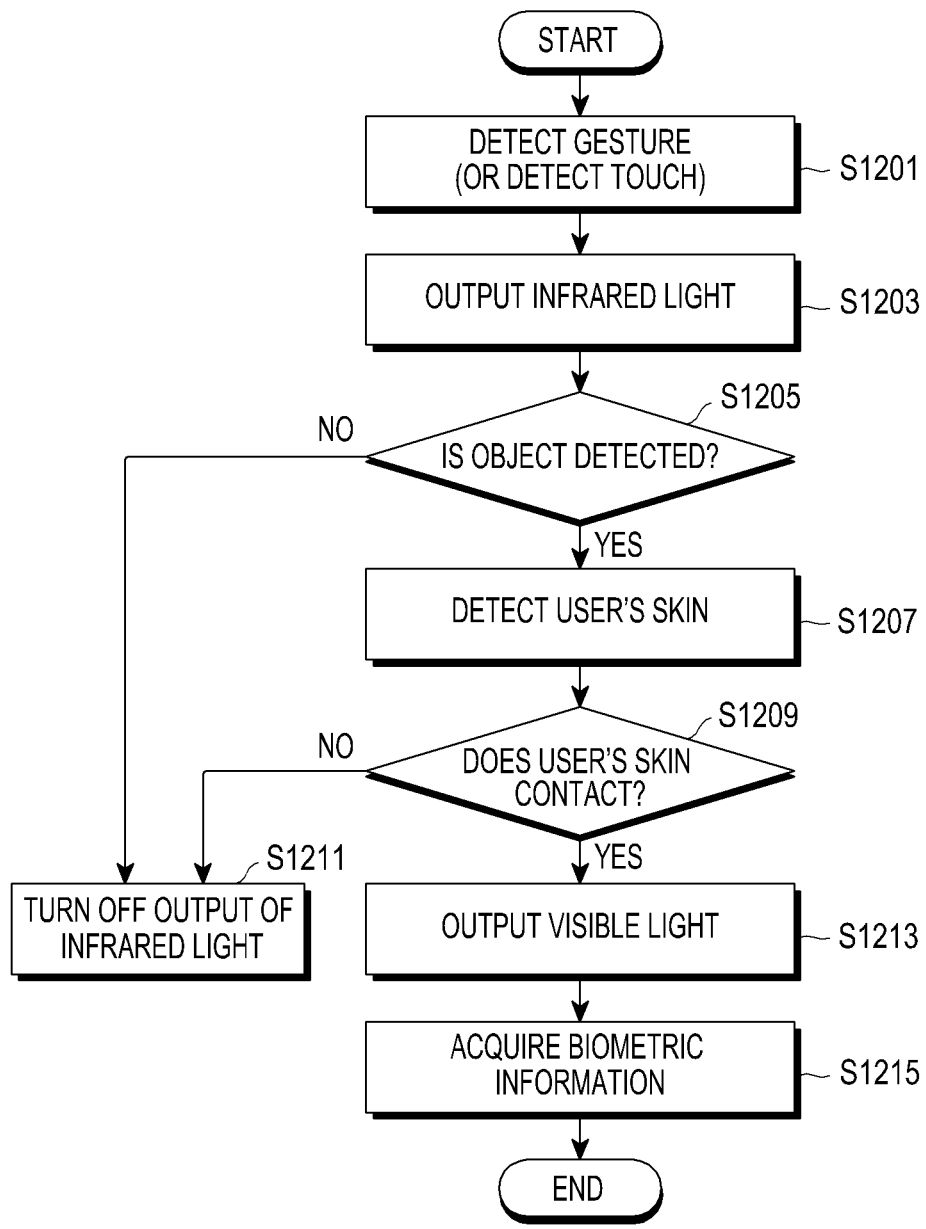
FIG. 12 is a flowchart illustrating an operation of the electronic device according to various embodiments of the present disclosure.

FIG. 12 is a flowchart illustrating an operation of the electronic device according to various embodiments of the present disclosure.

Referring to FIGS. 5, 6, 7A and 7B, and 8 to 12, the processor 540 may detect a user's gesture through the first sensor module 510 in operation S1201. Further, the processor 540 may also detect a user's touch through the touch sensor 530 in operation S1201.

The processor 540 may operate the second sensor module 520 to acquire the first biometric information (BI1) in response to the user's gesture. For example, the processor 540 may control the second sensor module 520 to output the infrared light in operation S1203.

The processor 540 may detect an object in proximity to the second sensor module 520 in operation S1205. For example, the processor 540 may detect the object through a DC voltage change by the infrared light received from the second sensor module 520.

When the object in proximity to the second sensor module 520 is not detected (No of operation S1205), the processor 540 may turn off the output of the infrared light in operation S1211.

When the object in proximity to the second sensor module is detected (Yes of operation S1205), the processor 540 may determine whether the object in proximity to the second sensor module 520 is the user's skin in operation S1207. For example, when the object in proximity to the second sensor module 520 is not the user's skin, the processor 540 may turn off the output of the infrared light.

When the object in proximity to the second sensor module 520 is the user's skin, the processor 540 may acquire the first biometric information (BI1) from the user's skin.

The processor 540 may determine whether the user's skin contacts (or grasps) the second sensor module 520 based on the first biometric information (BI1) in operation S1209.

When the user's skin does not contact the second sensor module 520 (No of operation S1209), the processor 540 may turn off the output of the infrared light in operation S1211.

When the user's skin contacts the second sensor module 520 (Yes of operation S1209), the processor 540 may control the second sensor module 520 to output the visible light (for example, red light) to acquire the second biometric information (BI2). For example, when the second biometric information (BI2) of the user is a heart rate, the processor 540 may selectively output the visible light. In contrast, when the second biometric information (BI2) is blood oxygen saturation of the user, the processor 540 should output the visible light necessarily.

The processor 540 may acquire the second biometric information (BI2) through the second sensor module 520 in operation S1215. For example, the processor 540 may acquire the second biometric information (BI2) based on at least one of the infrared light and the visible light.

Figure 13:
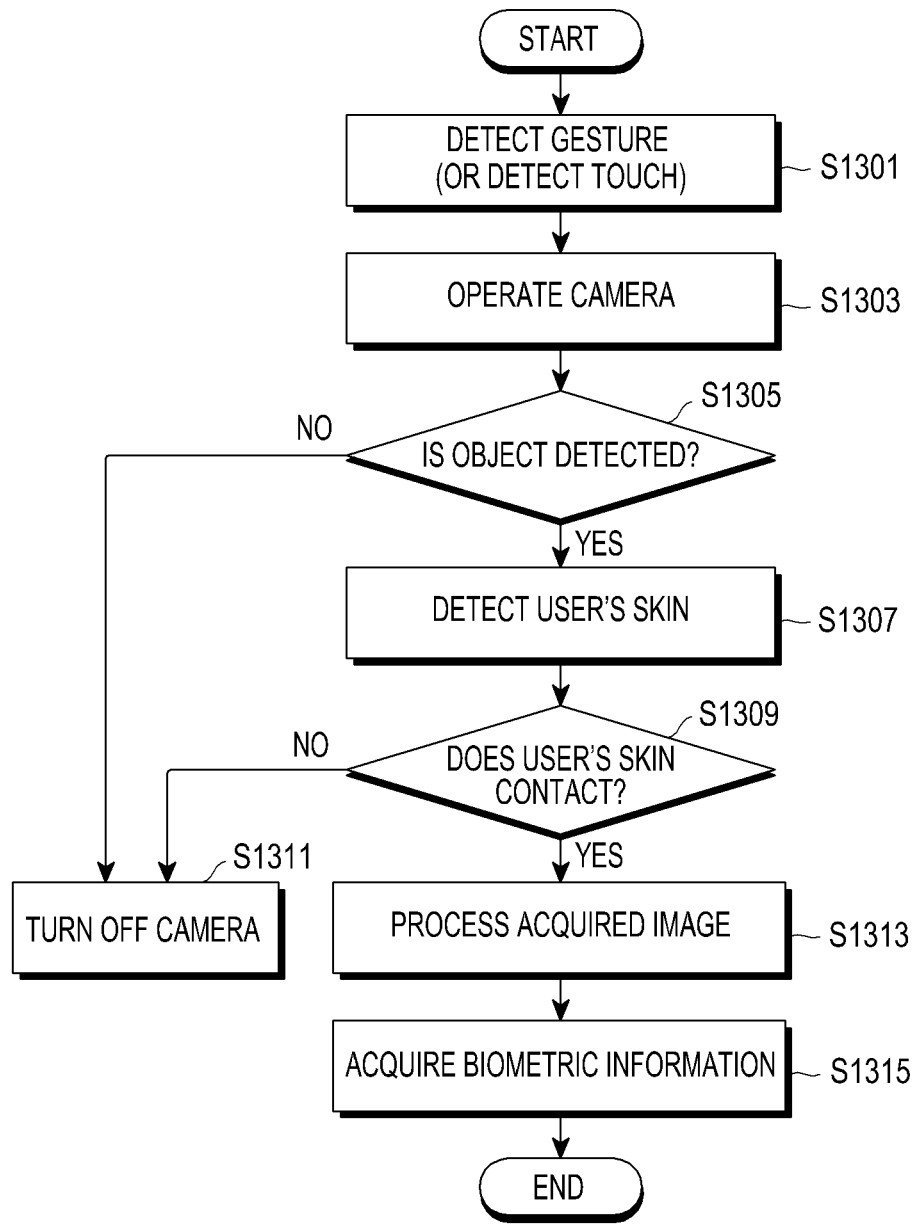
FIG. 13 is a flowchart illustrating an operation of the electronic device according to various embodiments of the present disclosure.

FIG. 13 is a flowchart illustrating an operation of the electronic device according to various embodiments of the present disclosure.

Referring to FIGS. 5, 6, 7A and 7B, and 8 to 13, the processor 540 may detect a user's gesture through the first sensor module 510 in operation S1301. Further, the processor 540 may detect a user's touch through the touch sensor 530 in operation S1301.

The processor 540 may operate the camera module 550 to acquire the first biometric image (BI1') in response to the user's gesture in operation S1303.

The processor 540 may analyze the first biometric image (BI1') and determine whether an object is in proximity to the camera module 550 in operation S1305.

When there is no object in proximity to the camera module 550 (No of operation S1305), the processor 540 may turn off (or stop) the operation of the camera module 550.

When the object is in proximity to the camera module 550 (Yes of operation S1305), the camera module 550 may detect the user's skin in operation S1307. For example, the processor 540 may detect the user's skin based on a DC voltage corresponding to a light signal received by the camera module 550.

The processor 540 may determine whether the user's skin contacts (or grasps) the second sensor module 520 based on the first biometric image (BI1') in operation S1309. For example, the processor 540 filter a particular color (for example, red) in the first biometric image (BI1') and determine whether the user's skin contacts the camera module 550 based on information on the particular color in the first biometric image (BI1').

When the user's skin does not contact the camera module 550 (No of operation S1309), the processor 540 may turn off the operation of the camera module in operation S1311.

When the user's skin contacts the second sensor module 520 (Yes of operation S1209), the processor 540 may acquire the second biometric image (BI2'). At this time, the processor 540 may process the acquired image by filtering the second biometric image (BI2') in operation S1313. For example, the processor 540 may filter a particular color (for example, red) in the second biometric image (BI2') and acquire information on the particular color (for example, red) in the second biometric image (BI2').

The processor 540 may then acquire the second biometric information (BI2) based on the information on the particular color (for example, red) in the second biometric image (BI2') in operation S1315. That is, the processor 540 may acquire the second biometric information (BI2) through the camera module 550 instead of the second sensor module 520.

Figure 14:
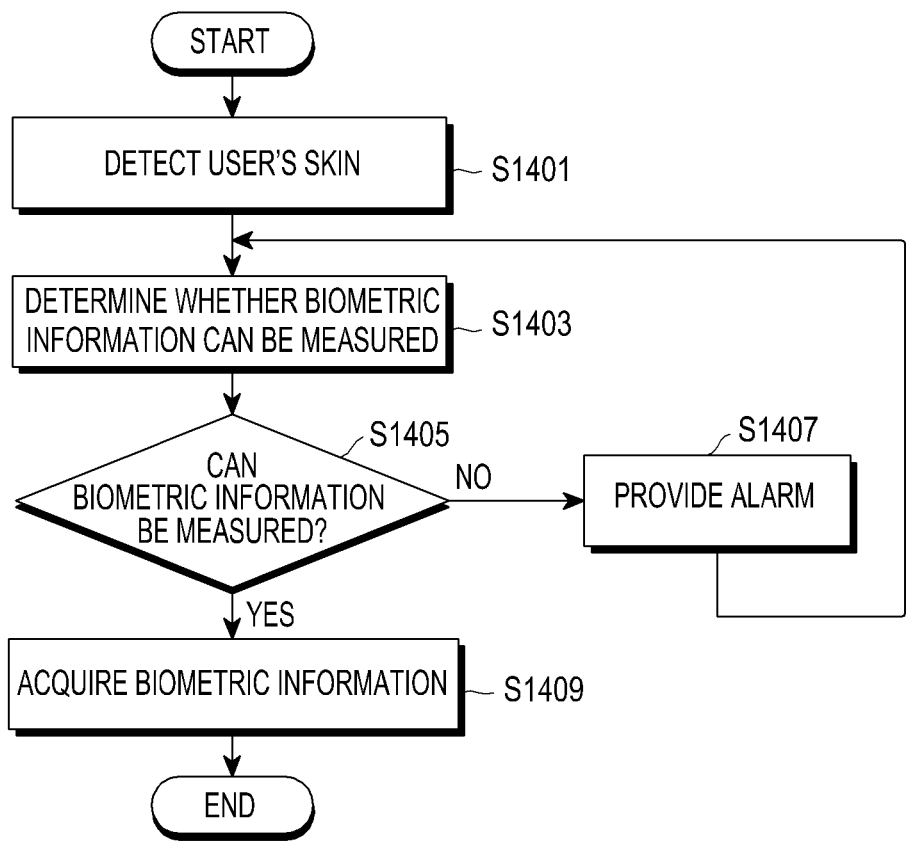
FIG. 14 is a flowchart illustrating an operation of the electronic device according to various embodiments of the present disclosure.

FIG. 14 is a flowchart illustrating an operation of the electronic device according to various embodiments of the present disclosure.

Referring to FIGS. 5, 6, 7A and 7B, and 8 to 14, the processor 540 may determine whether the user's skin contacts (or grasps) the second sensor module through the second sensor module 520 in operation S1401.

According to some embodiments, the processor 540 may determine whether the second sensor module 520 is in a state where the second biometric information (BI2) can be acquired (or measured) through the first sensor module 510 in operation S1403. For example, the processor 540 may determine whether the second sensor module 520 is in the state where the second biometric information (BI2) can be acquired (or measured) based on SI transmitted from the first sensor module 510.

When the second biometric information (BI2) cannot be acquired (or measured) (No of operation S1405), the processor 540 may provide an alarm that informing of a state in which the second biometric information (BI2) cannot be measured through the output device 570 and/or the display 580 in operation S1407.

When the second biometric information (BI2) can be acquired (or measured) (Yes of operation S1405), the processor 540 may acquire the second biometric information (BI2) through the second sensor module 520 in operation S1409.

A method of operating an electronic device according to various embodiments of the present disclosure may include: an operation of detecting a gesture through a first sensor module; an operation of acquiring first biometric information through a second sensor module in response to the gesture; an operation of determining whether a user's skin contacts the second sensor module based on the first biometric information; and an operation of acquiring second biometric information from the user's skin through the second sensor module according to a result of the determination.

The operation of detecting the gesture may include an operation of comparing the gesture with a preset gesture and driving the second sensor module according to a result of the comparison.

The operation of driving the second sensor module may include an operation of outputting an infrared light of the second sensor module.

The operation of whether the user's skin contacts the second sensor module may include: an operation of determining whether an object contacts the second sensor module; and an operation of determining whether the object is the user's skin based on the first biometric information.

The operation of determining whether the user's skin contacts the second sensor module may include an operation of acquiring the first biometric information from the user's skin through the second sensor module; and an operation of determining whether the user's skin contacts the second sensor module by comparing the first biometric information with preset biometric information.

The operation of determining whether the user's skin contacts the second sensor module may include an operation of determining whether the user's skin contacts the second sensor module based on at least one of a waveform of the first biometric information, a peak point of the waveform, and a pattern of the waveform.

The operation of acquiring the second biometric information may include an operation of determining whether the second sensor module is in a state where the second biometric information can be acquired through the first sensor module and acquiring the second biometric information according to a result of the determination.

The operation of determining whether the user's skin contacts the second sensor module may include an operation of determining whether the user's skin contacts the second sensor module based on an infrared light output from the second sensor module.

The operation of determining whether the user's skin contacts the second sensor module may include an operation of, when the user's skin does not contact the second sensor module, turning off an output of an infrared light.

The operation of acquiring the second biometric information may include an operation of, when the user's skin contacts the second sensor module, outputting a visible light from the second sensor module; and an operation of acquiring the second biometric information based on at least one of an infrared light and the visible light.

The operation of acquiring the second biometric information may include an operation of providing a state in which the second biometric information is measured through at least one of visual information, auditory information, and tactile information.

Figure 15A:
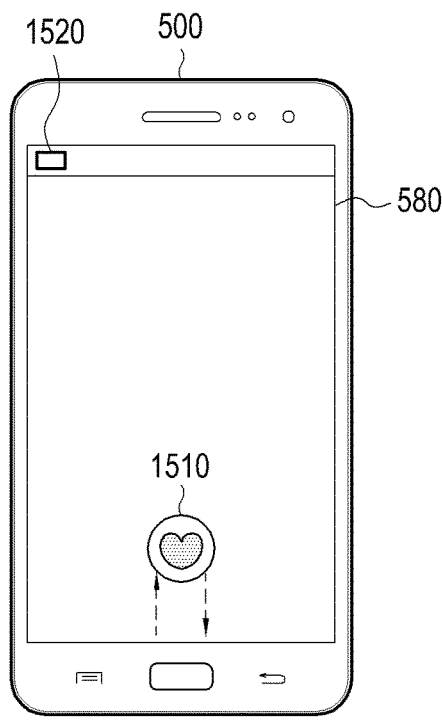
FIGS. 15A, 15B, and 15C illustrate user interfaces for describing an operation of the electronic device according to various embodiments of the present disclosure.
Figure 15B:
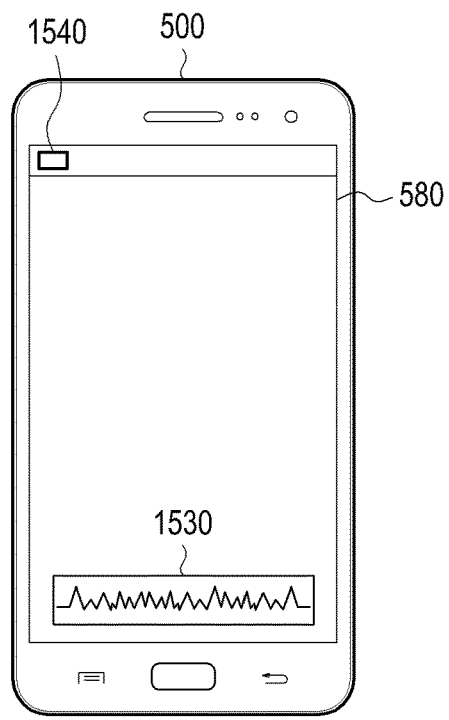
Figure 15C:
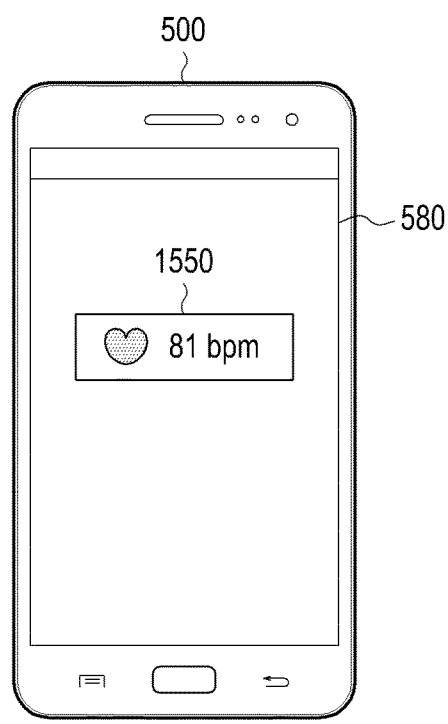

FIGS. 15A, 15B, and 15C illustrate user interfaces for describing an operation of the electronic device according to various embodiments of the present disclosure.

Referring to FIGS. 5, 6, 7A and 7B, 8 to 14, and 15A, FIG. 15A illustrates a user interface indicating a state where the electronic device 500 detects the user's skin (for example, user's finger) through the display 580.

According to some embodiments, when a user's gesture is detected, the processor 540 may operate the second sensor module 520 to acquire the first biometric information (BI1). At this time, the processor 540 may detect the user's skin through the second sensor module 520. For example, the processor 540 may determine whether the user's skin contacts (or grasps) the second sensor module 520.

According to some embodiments, when the user's skin is detected through the second sensor module 520, the processor 540 may display a first icon 1510 through the display 580. For example, the first icon 1510 may refer to an icon indicating a state in which the electronic device 500 detects the user's skin and the first biometric information (BI1) is measured from the user's skin.

For example, when the detection of the user's skin through the second sensor module 520 starts, the processor 540 may control the display 580 such that the first icon 1510 rises from the bottom of the display 580.

Further, when the user's skin is not detected through the second sensor module 520, the processor 540 may control the display 580 such that the first icon 1510 descends to the bottom of the display 580. At this time, the processor 540 may control the display 580 not to display the first icon 1510.

Further, when the user's skin is detected through the second sensor module 520, the processor 540 may display a second icon on a status indication bar. For example, similar to the first icon, the second icon 1520 may refer to an icon indicating a state in which the electronic device 500 detects the user's skin and the first biometric information (BI1) is measured from the user's skin.

For example, when the detection of the user's skin through the second sensor module 520 starts, the processor 540 may display the second icon 1520 on the status indication bar. Further, when the user's skin is not detected through the second sensor module 520, the processor 540 may control the display 580 to make the second icon 1520 disappear from the status indication bar.

Referring to FIGS. 5, 6, 7A and 7B, 8 to 14, 15A, and 15B, FIG. 15B illustrates a user interface indicating a state in which the electronic device 500 acquires (or measures) the second biometric information (BI2) from the user's skin (for example, user's finger) through the display 580.

When the user's skin (for example, user's finger) contacts (or grasps) the second sensor module 520, the processor 540 may acquire (or measure) the second biometric information (BI2).

According to some embodiments, the processor 540 may display a status box 1530 for the second biometric information (BI2) acquired (or measured) from the user's skin.

The status box 1530 for the second biometric information (BI2) may refer to a window or a screen indicating a state in which the electronic device 500 measures the second biometric information (BI2) from the user's skin.

For example, the status box 1530 for the second biometric information (BI2) may display the second biometric information (BI2) acquired in real time through the second sensor module 520 or the camera module 550. Further, the status box 1530 for the second biometric information (BI2) may display a signal corresponding to the second biometric information (BI2) acquired in real time through the second sensor module 520 or the camera module 550.

In addition, the processor 540 may display a third icon 1540 for the second biometric information (BI2) acquired (measured) from the user's skin on the status indication bar. For example, the third icon 1540 may refer to an icon indicating a state in which the electronic device 500 measures the second biometric information (BI2) from the user's skin.

Referring to FIGS. 5, 6, 7A and 7B, 8 to 14, 15A, 15B, and 15C, FIG. 15C illustrates a user interface through which the electronic device 500 provides the user with the second biometric information (BI2) acquired from the user's skin (for example, user's finger) through the display 580.

When the user's skin (for example, user's finger) contacts (or grasps) the second sensor module 520, the processor 540 may acquire (or measure) the second biometric information (BI2). At this time, the processor 540 may provide the user with the second biometric information (BI2) through the display 580.

According to some embodiments, when the second biometric information (BI2) is a heart rate of the user and the measurement of the second biometric information (BI2) is completed, the processor 540 may display a result screen of a heart rate measurement application on the display 580.

For example, when the measurement of the user's heart rate is completed, the processor 540 may display the measured user's heart rate 1550 on the display 580.

A computer-readable recording medium storing a program according to various embodiments of the present disclosure may store a program to perform operations is provided. The operations include: an operation of detecting a gesture through a first sensor module; an operation of detecting biometric information through a second sensor module; determining whether a user's skin contacts the second sensor module; and an operation of acquiring the biometric information from the user's skin through the second sensor module according to a result of the determination.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

While the present disclosure has been shown and described with reference to various embodiments thereof, it will be understood by those skilled in the art that various changes form and details may be made therein without departing from the spirit and scope of the present disclosure as defined by the appended claims and their equivalents.

What is claimed is:

1. A method of operating an electronic device, the method comprising:
   detecting a command for measuring specific biometric information;
   in response to detecting the command, acquiring, using a biometric sensor of the electronic device, a first signal provided by a first light which is reflected through a user's skin during a first time period, the first light corresponding infrared light;
   identifying whether a contact state between the user's skin and the biometric sensor is in a state capable of measuring the specific biometric information based on waveforms of the first signal during the first time period;
   in response to the identifying that the contact state between the user's skin and the biometric sensor is in the state capable of measuring the specific biometric information, acquiring, using the biometric sensor, a second signal provided by a second light which is reflected through the user's skin during a second time period after the first time period, the second light corresponding at least one of visible light and infrared light for measuring the specific biometric information; and
   identifying the specific biometric information based on the second signal,
   wherein the specific biometric information includes information related to a health state of the use, and
   wherein the detecting of the command comprises:
   identifying, using a first sensor of the electronic device, the command by comparing a gesture with a preset gesture, and
   driving the biometric sensor according to a result of the comparison.

2. The method of claim 1 wherein the driving of the biometric sensor comprises outputting an infrared light from the biometric sensor.

3. The method of claim 1, wherein the identifying of whether the contact state comprises:
   identifying whether an object contacts the biometric sensor; and
   identifying whether the object is the user's skin based on the waveforms of the first signal.

4. The method of claim 1, wherein the identifying of whether the contact state comprises:
acquiring the first signal from the user's skin through the biometric sensor; and
identifying whether the contact state between the user's skin and the biometric sensor is in the state capable of measuring the specific biometric information by comparing the waveforms of the first signal with preset waveforms.

5. The method of claim 4, wherein the identifying of whether the contact state comprises identifying whether the contact state between the user's skin and the biometric sensor is in the state capable of measuring the specific biometric information based on at least one of a shape of the waveforms, a peak point of the waveforms, or a pattern of the waveforms.

6. The method of claim 1, wherein the acquiring of the second signal comprises:
identifying whether the biometric sensor is in a state where the specific biometric information can be measured; and
acquiring the second signal according to a result of the identification.

7. The method of claim 1, wherein the identifying of whether the contact state comprises:
turning on an infrared light source of the biometric sensor; and
identifying whether the contact state between the user's skin and the biometric sensor is in the state capable of measuring the specific biometric information based on an infrared light output from the infrared light source.

8. The method of claim 7, wherein the identifying of whether the contact state comprises, when the user's skin does not contact the biometric sensor, turning off the infrared light source.

9. The method of claim 7, wherein the acquiring of the second signal comprises:
when the contact state between the user's skin and the biometric sensor is in the state capable of measuring the specific biometric information, turning on a visible light source of the biometric sensor; and
acquiring the second signal based on at least one of the infrared light output from the infrared light source or a visible light output from the visible light source.

10. The method of claim 9, wherein the acquiring of the second signal comprises providing a state in which the specific biometric information is measured through at least one of visual information, auditory information, or tactile information.

11. An electronic device comprising:
a memory;
a biometric sensor; and
at least one processor configured to:
detect a command for measuring specific biometric information,
in response to detecting the command, acquire, using the biometric sensor, a first signal provided by a light which is reflected through a user's skin during a first time period, the first light corresponding infrared light,
identify whether a contact state between a user's skin and the biometric sensor is in a state capable of measuring the specific biometric information based on waveforms of the first signal, during the first time period,
in response to the identifying that the contact state between the user's skin and the biometric sensor is in the state capable of measuring the specific biometric information, acquire, using the biometric sensor, a second signal provided by a light which is reflected through the user's skin during a second time period after the first time period, the second light corresponding at least one of visible light and infrared light for measuring the specific biometric information, and
identify the specific biometric information based on the second signal,
wherein the specific biometric information includes information related to a health state of the user, and
wherein the at least one processor is further configured to:
identify, using a first sensor of the electronic device, the command by comparing a gesture with a preset gesture stored in the memory, and
output an infrared light from the biometric sensor in order to acquire the first signal according to a result of the comparison.

12. The electronic device of claim 11, wherein the at least one processor is further configured to:
acquire the first signal from the user's skin through the biometric sensor, and
identify whether the contact state between the user's skin and the biometric sensor is in the state capable of measuring the specific biometric information by comparing the waveforms of the first signal with preset waveforms stored in the memory.

13. The electronic device of claim 12, wherein the at least one processor is further configured to identify whether the contact state between the user's skin and the biometric sensor is in the state capable of measuring the specific biometric information based on at least one of a shape of the waveforms, a peak point of the waveforms, or a pattern of the waveforms.

14. The electronic device of claim 11, wherein the at least one processor is further configured to:
identify whether the biometric sensor is in a state where the specific biometric information can be measured, and
acquire the second signal according to a result of the identification.

15. The electronic device of claim 11, wherein the at least one processor is further configured to identify whether the contact state between the user's skin and the biometric sensor is in the state capable of measuring the specific biometric information based on an infrared light output from an infrared light source of the biometric sensor.

16. The electronic device of claim 15, wherein, when the contact state between the user's skin and the biometric sensor is in the state capable of measuring the specific biometric information, the at least one processor is further configured to:
output a visible light from a visible light source of the biometric sensor, and
acquire the second signal based on at least one of the infrared light or the visible light.

17. The electronic device of claim 11, wherein the at least one processor is configured to:
acquire the first signal related to the user's skin through a camera of the electronic device, and
identify whether the contact state between the user's skin and the camera is in the state capable of measuring the specific biometric information based on a first image provided by a light which is reflected through the user's skin, in response to the identifying that the contact state between the user's skin and the camera is in the state capable of measuring the specific biometric information, acquire, using the camera, a second image provided by a light which is reflected through the user's skin, and identify the specific biometric information based on the second image.

18. A non-transitory computer-readable recording medium configured to store one or more computer programs including instructions that, when executed by at least one processor, cause the at least one processor to control for:

detecting a command for measuring specific biometric information;

acquiring, using a biometric sensor of an electronic device, a first signal provided by a first light which is reflected through a user's skin during a first time period, the first light corresponding to infrared light;

identifying whether a contact state between the user's skin and the biometric sensor is in a state capable of measuring the specific biometric information based on waveforms of the first signal during the first time period;

in response to the identifying that the contact state between the user's skin and the biometric sensor is in the state capable of measuring the specific biometric information, acquiring, using the biometric sensor, a second signal provided by a second light which is reflected through the user's skin during a second time period after the first time period, the second light corresponding to at least one of visible light and infrared light for measuring the specific biometric information; and identifying the specific biometric information based on the second signal, wherein the specific biometric information includes information related to a health state of the user, and wherein the detecting of the command comprises:

identifying, using a first sensor of the electronic device, the command by comparing a gesture with a preset gesture, and driving the biometric sensor according to a result of the comparison.

\* \* \* \* \*